United States Patent [19]
Haefner et al.

[11] 3,724,478
[45] Apr. 3, 1973

[54] TURN-UP VORTEX VALVE

[75] Inventors: Kenneth Browning Haefner, Schenectady; Carl Gustav Ringwall, Scotia, both of N.Y.

[73] Assignee: General Electric Company, New York, N.Y.

[22] Filed: Dec. 17, 1971

[21] Appl. No.: 209,276

[52] U.S. Cl. ................................................137/81.5
[51] Int. Cl. ................................................F15c 1/16
[58] Field of Search....................................137/81.5

[56] References Cited

UNITED STATES PATENTS

| 3,474,670 | 10/1969 | Rupert | 137/81.5 X |
| 3,481,352 | 12/1969 | Starr | 137/81.5 |
| 3,513,865 | 5/1970 | Van Der Heyden | 137/81.5 |
| 3,643,676 | 2/1972 | Limage et al. | 137/81.5 X |

*Primary Examiner*—William R. Cline
*Attorney*—Philip L. Schlamp et al.

[57] ABSTRACT

A turn-up vortex valve for modulating fluid flow including an enclosed substantially cylindrical spin chamber having an output port formed in at least one end wall thereof, at least one control pressure port formed in a wall of the chamber for admitting a control fluid flow tangentially to the perimeter of the chamber, and an inlet supply port formed in a wall of the chamber for admitting the fluid supply flow on an angle to the perimeter of the chamber whereby in contradistinction to prior art forms of vortex valves modulation of the supply flow is achieved with control pressure equal to or less than the supply flow pressure and whereby the output flow from the turn-up vortex valve is in phase with the control flow pressure.

9 Claims, 4 Drawing Figures

TURN-UP VORTEX VALVE

The invention herein described was made in the course of or under a contract or subcontract thereunder, with the Department of the Army.

BACKGROUND OF THE INVENTION

1. Field of the Invention

Our invention relates to flow regulators of the type which do not utilize mechanical flow impeding means for modulating a fluid flow, and more particularly to an improvement in vortex valve type flow regulators wherein a control pressure is employed to modulate the input supply flow.

2. Description Of The Prior Art

Vortex valves as they have been known heretofore in the prior art have comprised devices consisting of a chamber having arcuate peripheral side walls which are closed by a pair of planar end walls. The supply fluid which is admitted to the chamber through an inlet port flows adjacent to the aforementioned peripheral side walls during the course of its passage through the chamber and exits through an output port suitably provided generally in one of the pair of planar end walls. A jet of control fluid is supplied into the chamber tangentially in a manner whereby the control fluid restrains the passage of supply fluid into the chamber and through the valve.

Such prior art vortex valves have been in the nature of turn-down valves. That is, they have operated in a turn-down manner such that as the pressure of the control fluid flow to the valve is increased above the pressure of the input supply flow, the valve output flow is reduced. Conventional "state-of-the-art" vortex valves have commonly possessed an equivalent area turn-down capability in the range of 8 to 10. However, in order to achieve this turn-down range the control for the valve has had to be derived from a pressure source approximately 20 percent higher than the pressure supply source to the valve. Thus, if it were possible to eliminate the requirement for a control pressure in excess of the supply pressure a significant improvement in efficiency could be achieved for applications wherein higher pressures can only be obtained at the expense of an increased power input.

OBJECTS OF THE INVENTION

It is therefore an object of the present invention to provide a novel and improved turn-up vortex valve for modulating fluid flow wherein flow modulation can be accomplished with a control pressure less than or equal to the supply pressure.

It is another object of the present invention to provide such a turn-up vortex valve which is capable of furnishing an overall flow modulation in the order of 4 to 1.

A further object of the present invention is to provide such a turn-up vortex valve wherein the output flow from the valve is in phase with the control pressure such that the output flow increases as the control pressure is increased.

A still further object of the invention is to provide such a turn-up vortex valve which is relatively easy to manufacture and assemble but which by virtue of the fact that it contains no moving parts is yet nevertheless capable of providing long life and reliability in operation.

SUMMARY OF THE INVENTION

In accordance with a preferred form of the invention there is provided a turn-up vortex valve for modulating fluid flow. The turn-up vortex valve includes an enclosed substantially cylindrical spin chamber formed by a pair of spaced, parallel, planar end walls which are suitably retained in juxtaposed relation to opposite sides of a cylindrically shaped side wall. At least one of the pair of end walls is provided with an output port. In addition, at least one control pressure port is provided in the cylindrical wall of the chamber for admitting a control fluid flow tangentially to the perimeter of the chamber. Also, an inlet supply port is provided in the cylindrical wall of the chamber for admitting the fluid supply flow on an angle to the perimeter of the chamber whereby, in contradistinction to prior art forms of vortex valves, modulation of the supply flow is achieved with control pressure equal to or less than the supply flow pressure and whereby the output flow from the turn-up vortex valve is in phase with the control flow pressure.

The invention will be more fully understood from the following detailed description and its scope will be pointed out in the appended claims.

DESCRIPTION OF A PREFERRED EMBODIMENT

Figure 1:
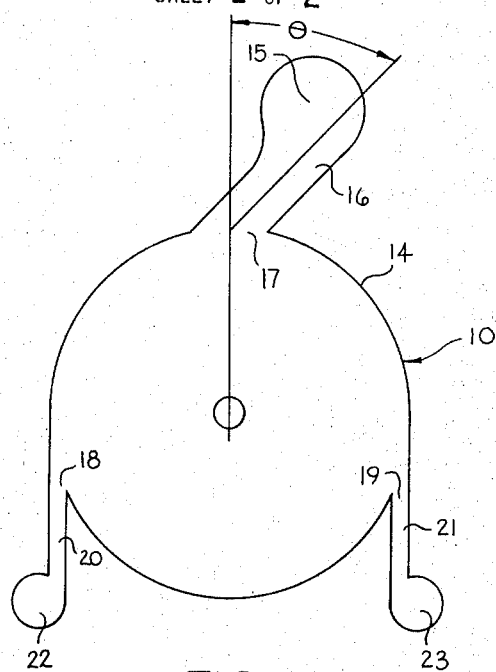
FIG. 1 is a schematic diagram of the turn-up vortex valve for modulating fluid flow in accordance with the present invention.
Figure 2:
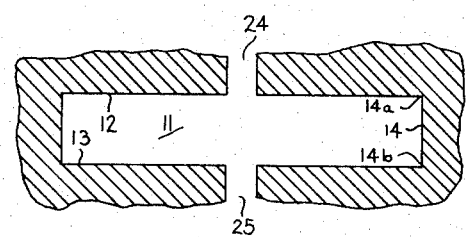
FIG. 2 is a partial schematic sectional view of the turn-up vortex valve for modulating fluid flow in accordance with the present invention.

Referring to FIGS. 1 and 2 of the drawing, the invention as illustrated therein comprises a turn-up vortex valve, generally designated by reference numeral 10, for use preferably in modulating fluid flow. The turn-up vortex valve 10 includes an enclosed, substantially cylindrical spin chamber 11 formed in accordance with one form of the invention by a pair of spaced, parallel, planar end walls 12 and 13 which are retained by suitable means (not shown) such as fasteners, adhesive, etc., in justaposed abutting relation to opposite sides 14a and 14b, respectively, of a cylindrically shaped side wall 14. However, it is also contemplated without departing from the essence of the present invention that one of the end walls 12 or 13 may be formed integrally with the side wall 14 such as to form a cup-shaped member with the remaining open side thereof being closed by the other of the pair of end walls 12 and 13, and with the latter end wall being affixed in the aforementioned closing position relative to the cup-shaped member by suitable means of the type previously referred to hereinabove.

Fluid under pressure is supplied from a suitable source 15 to the spin chamber 11 by means of a conduit 16 which terminates in a supply inlet nozzle 17 formed in cylindrically shaped side wall 14. For a purpose to be described more fully hereinafter, the inlet supply of fluid as best understood with reference to FIG. 1 of the drawing is oriented at an angle of $\theta$, to the radius of spin chamber 11. More specifically, the angle $\theta$ illustrated in FIG. 1 comprises an angle of approximately 45°. In addition, the supply inlet nozzle 17 is designed to produce approximately a 10 percent pressure drop in the pressure of the supply fluid and to accelerate the supply fluid as the latter passes through the nozzle 17.

Referring now further to FIG. 1 of the drawing, at least one but preferably a pair of tangential control ports 18 and 19 are provided along opposite sides of cylindrically shaped side wall 14. Opposing flows of fluid which are provided from the control ports 18 and 19 are employed as the control input to the turn-up vortex valve 10. In accordance with the preferred embodiment of the invention, each of the control ports 18 and 19 has an area approximately one-tenth that of the supply inlet nozzle 17. Each of the control ports 18 and 19 is interconnected by means of a conduit 20 and 21, respectively, to a suitable source 22 and 23, respectively, of control fluid. In a manner to be set forth with more particularity hereinafter, modulation of the supply fluid flow is effected by means of this control fluid flow.

As depicted in FIG. 2 of the drawing, turn-up vortex valve 10 is also provided with a pair of output ports 24 and 25 through which the fluid supplied to the spin chamber 11 is discharged. The output ports 24 and 25 are suitably provided in each of the planar end walls 12 and 13, respectively, such as to be located substantially at the center thereof. Although in accordance with the preferred embodiment of the invention, turn-up vortex valve 10 is depicted as being provided with a pair of output ports 24 and 25, it is also contemplated without departing from the essence of the invention that if so desired only one such output port need be provided.

Turning now to a description of the mode of operation of the turn-up vortex valve 10 in accordance with the instant invention, note is first taken of the fact that among others three significant structural differences exist between the subject turn-up vortex valve 10 and the heretofore existing conventional vortex valves. Thus as noted previously, the supply inlet nozzle is oriented at an angle of $\theta$ to the spin chamber 11 such that $\theta$ equals approximately 45°, the supply inlet nozzle 17 is designed to produce a 10 percent pressure drop and to accelerate the supply fluid as it passes therethrough, and two tangential control ports 18 and 19 with opposing flows and each having an area approximately one-tenth the area of the supply inlet nozzle 17 are employed as the control input to the turn-up vortex valve 10.

Figure 3:
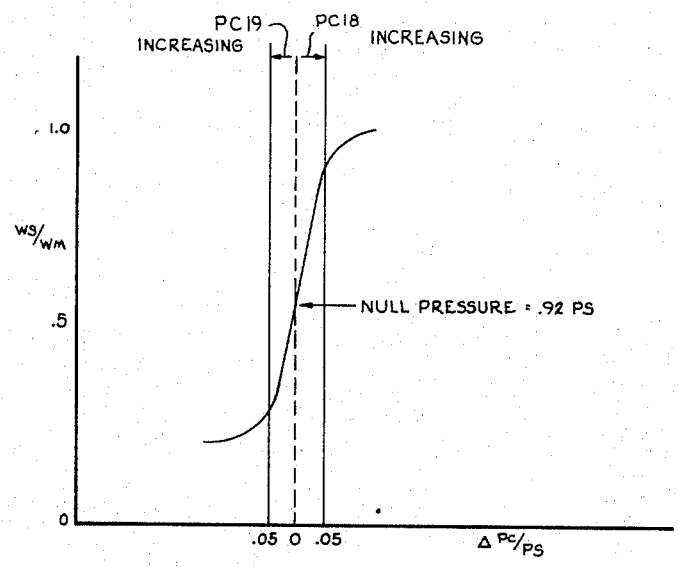
FIG. 3 is a graphical representation of the theoretical flow-pressure characteristics of the turn-up vortex valve in accordance with the present invention.

The turn-up vortex valve 10 has a flow with no control inputs which is less than the maximum possible output flow of the valve. Further, the flow of the turn-up vortex valve 10 at a null condition is at a value which produces approximately slightly more than one-half the maximum flow output of the valve 10. This is clearly to be seen with reference to FIG. 3 of the drawing which is a graphical representation of the flow-pressure characteristics of the turn-up vortex valve 10, and wherein the ordinate of the graph of FIG. 3 is designated in terms of the ratio of $W_s/W_m$, i.e., the ratio of the supply flow to the maximum fluid flow through the turn-up vortex valve 10 while the abscissa of the graph of FIG. 3 is designated in terms of the ratio of $\Delta P_c/P_s$, i.e., the ratio of the difference in the control pressures existing at the control ports 18 and 19 to the pressure of the supply flow.

The reduced flow results from the tangential velocity imparted to the fluid by virtue of the fact that the supply inlet nozzle 17 is oriented at an angle $\theta$ of approximately 45° to the circumference of the spin chamber 11 and by virtue of the fact that the supply flow is accelerated as it enters the interior of the spin chamber 11 through supply inlet nozzle 17. Due to the conservation of angular momentum, the tangential velocity of the fluid in the spin chamber 11 increases as the fluid moves therewithin toward the output ports 24 and 25 of the turn-up vortex valve 10.

The increase in the tangential velocity of the fluid within the spin chamber 11 results in producing a radial back pressure which tends to reduce the fluid flow. By increasing the control flow at control port 18, the tangential velocity of the jet of supply fluid being discharged through supply inlet nozzle 17 into the spin chamber 11 is reduced thus lowering the aforereferenced back pressure and, as seen with reference to the curve depicted in FIG. 3, increasing the overall fluid flow through the turn-up vortex valve 10. The maximum fluid flow through the valve 10 is achieved at a control pressure at control port 18 which is slightly higher than the supply pressure. Further increase in the control flow at control port 18 produces a flow reduction through turn-up vortex valve 10 comparable to the conventional vortex valve with a maximum fluid flow reduction in the order of a factor of 5 at $P_{c18} = 1.2 P_s$.

On the other hand, introducing a control flow at the other of the control ports, i.e., control port 19 will result in an increased tangential velocity of the fluid flow within the spin chamber 11 which in turn raises the back pressure in the turn-up vortex valve 10 and thereby reduces the overall fluid flow from the valve 10. This is depicted by the curve illustrating the theoretical flow-pressure characteristics of the turn-up vortex valve 10 as shown in FIG. 3 of the drawing. The application of a control pressure at control port 19 which is equivalent to the pressure of the supply flow results in a reduction of the fluid flow by a factor of approximately two which in turn furnishes an overall fluid flow modulation within the turn-up vortex valve 10 of 4:1.

Thus it is seen that fluid flow modulation in the turn-up vortex valve 10 is derived from the tangential velocity or swirl imparted to the fluid in the valve spin chamber 11. By varying the control flow through the two control ports 18 and 19, the tangential velocity imparted to the supply flow can be increased or decreased by the transfer of momentum thus modulating the overall fluid flow in the valve 10. Control is applied in push-pull to these two opposing control ports 18 and 19. Further, it is possible to accomplish this fluid flow modulation in the turn-up vortex valve 10 with a control flow pressure at control ports 18 and 19 which is less than the pressure of the supply fluid. This is in contradistinction to prior art forms of vortex valves which require a control flow pressure approximately 20 percent higher than the pressure of the supply fluid to the valve. Based on test results, it is estimated that a 4:1 flow variation can be obtained with the subject turn-up vortex valve 10.

Figure 4:
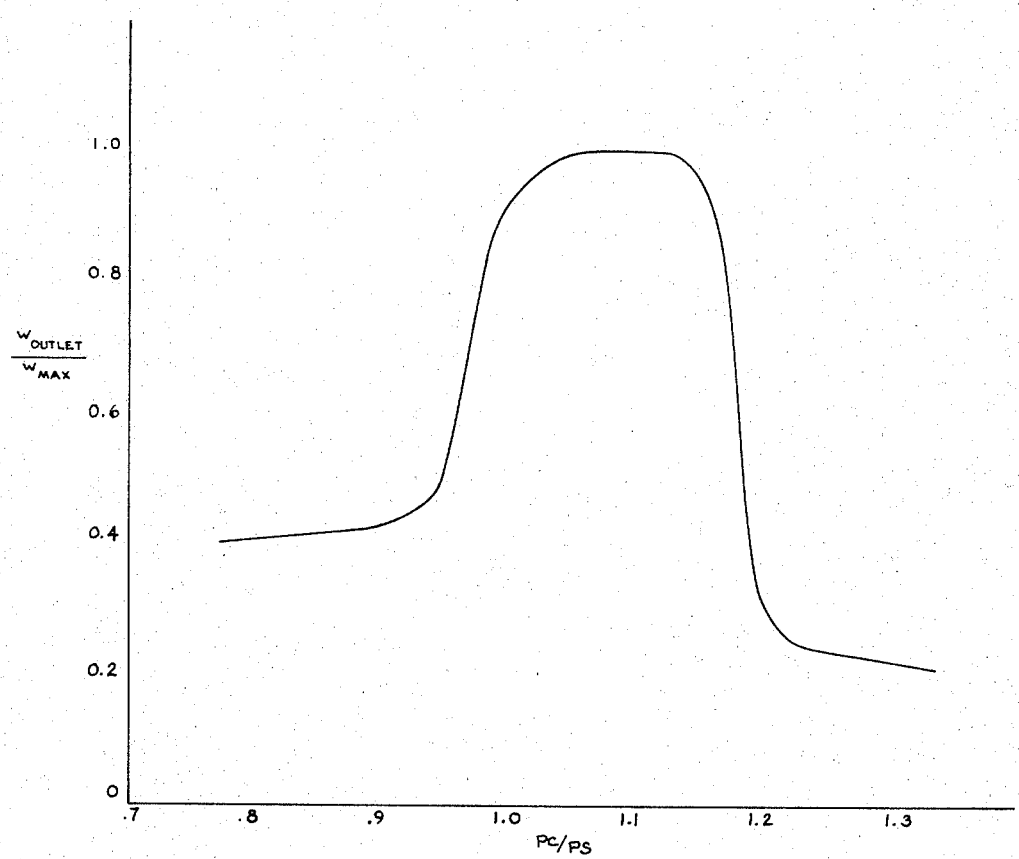
FIG. 4 is a graphical representation of the actual operating characteristics of one embodiment of a turn-up vortex valve in accordance with the present invention.

Referring now to FIG. 4 of the drawing, a curve is depicted therein which comprises a graphical representation of the actual operating characteristics obtained from running tests on one form of a turn-up vortex valve modified slightly from that illustrated in FIG. 1 of the drawing but yet constructed such as to embody therein the essence of the instant invention. That is, the turn-up vortex valve on which tests were run to obtain the curve of FIG. 4 included only one tangential control port, i.e., control port 18 for controlling the supply fluid flow. The ordinate of the graph of FIG. 4 is designated in terms of the ratio of $W_{outlet}/W_{maximum}$, i.e., the ratio of the outlet flow from the valve to the maximum fluid flow therethrough while the abscissa of the graph of FIG. 4 is designated in terms of the ratio of $P_c/P_s$, i.e., the ratio of the control pressure existing at the control port 18 to the pressure of the supply flow. More specifically, the curve in FIG. 4 was generated from data obtained on a turn-up vortex valve embodying the essence of the present invention which had the following characteristics:

Spin chamber diameter = 0.49 inches
Inlet supply angle $\theta = 45°$
Supply inlet nozzle = 0.09 × 0.092 inches
Control inlet port = 0.01 × 0.092 inches
Outlet port = 0.063 in. diameter hole
Fluid = air
Temperature = 70° F
$W_{max}$ = 2.55 scfm Although this latter turn-up vortex valve included only one control port, the data taken from the test run thereon nevertheless proves conclusively that effective flow modulation of a vortex valve can be obtained with control pressures equal to and less than the supply pressure. Further it is to be noted that this turn-up vortex valve offers a 10 to 1 flow gain with respect to supply versus control at maximum flow, and that a flow control range of better than 2:1 with a total system pressure drop of less than 5 percent across the turn-up vortex valve was achieved on air. Comparable performance for the turn-up vortex valve would be expected with other organic fluids in their vapor states.

Thus, in accordance with the present invention there has been provided a novel and improved turn-up vortex valve for modulating fluid flow wherein flow modulation can be accomplished with a control pressure less than or equal to the supply pressure which is in contradistinction to the mode of operation of prior art forms of vortex valves which required that the control pressure exceed the valve supply pressure by 20 percent for effective modulation of the flow. Further, the turn-up vortex valve of the instant invention is capable of furnishing an overall flow modulation in the order of 4 to 1. In addition, with the subject turn-up vortex valve the output flow from the valve is in phase with the control pressure such that the output flow increases as the control pressure is increased. In this regard it is noted that the prior art vortex valves have been in the nature of turn-down valves such that as the pressure of the control fluid flow to the valve is increased above the pressure of the input supply flow the valve output flow is reduced. Finally the turn-up vortex valve of the present invention although being relatively easy to manufacture and assemble is nevertheless by virtue of the fact that it contains no moving parts capable of providing long life and reliability in operation.

While only one embodiment of our invention has been specifically illustrated in FIGS. 1 and 2 of the drawings of the instant application, some modifications thereof have been referred to hereinabove. For example, as mentioned previously hereinabove, if so desired the turn-up vortex valve 10 may be provided with only one control port and/or only one outlet port without departing from the essence of the present invention. Furthermore it will be appreciated that many other modifications thereof may readily be made by those skilled in the art. We therefore intend by the appended claims to cover the above modifications as well as all other modifications which fall within the true spirit and scope of our invention.

What we claim as new and desire to secure by Letters Patent of the United States is:

1. In a vortex valve flow regulator for modulating fluid flow of the type having no mechanical flow impeding means, the improvement comprising:
   a. an enclosed substantially cylindrical spin chamber having a pair of spaced, parallel, planar end walls, and a cylindrically shaped side wall;
   b. a supply inlet passage oriented at an angle of approximately 45° to the perimeter of said cylindrically shaped side wall for supplying fluid to said spin chamber, said supply inlet passage extending through said cylindrically shaped side wall and terminating in a supply inlet nozzle;
   c. said supply inlet nozzle producing a pressure drop in said supply fluid and accelerating said supply fluid as the latter flows through said supply inlet nozzle into said spin chamber;
   d. at least one control port extending through said cylindrically shaped side wall at a first location for directing a control flow tangentially into said spin chamber to modulate the flow of said supply fluid, said control flow being at a pressure equal to or less than the pressure of said supply fluid; and
   e. at least one of said pair of end walls including an output port through which said supply fluid flow is discharged from said spin chamber, said flow from said output port being in phase with the pressure of said control flow such that as the pressure of said control flow through said control port increases said flow from said output port also increases.

2. In a vortex valve flow regulator as set forth in claim 1 wherein:
   a. said pressure drop produced by said supply inlet nozzle has a value of approximately 10 percent of the supply fluid pressure; and
   b. the area of said control port is equal to approximately one-tenth the area of said supply inlet nozzle.

3. In a vortex valve flow regulator as set forth in claim 1 further comprising:
   a. a second control port extending through said cylindrically shaped side wall at a second location for directing a control flow tangentially into said spin chamber to modulate the flow of said supply fluid; and b. said control flow from said at least one control port and said control flow from said second control port being applied in a push-pull relation.

4. In a vortex valve flow regulator as set forth in claim 3 wherein the other of said pair of end walls includes an output port through which said supply fluid flow is capable of being discharged from said spin chamber.

5. In a vortex valve flow regulator as set forth in claim 4 wherein:
   a. said pressure drop produced by said supply inlet nozzle has a value of approximately 10 percent of the supply fluid pressure; and
   b. the area of said at least one control port and said second control port are each equal to approximately one-tenth the area of said supply inlet nozzle.

6. In a vortex valve flow regulator as set forth in claim 5 wherein flow modulation in the order of up to 4 to 1 is possible.

7. A regulator for modulating fluid flow of the type having no mechanical flow impeding means comprising:
   a. an enclosed substantially cylindrical spin chamber having a pair of spaced, parallel, planar end walls, and a cylindrically shaped side wall;
   b. a supply inlet passage for supplying fluid into said spin chamber at an angle of approximately 45° to the circumference of said spin chamber, said supply inlet passage extending through said cylindrically shaped side wall and terminating in a supply inlet nozzle;
   c. said supply inlet nozzle producing a pressure drop in said supply fluid and accelerating said supply fluid as the latter flows through said supply inlet nozzle into said spin chamber;
   d. a first control port extending through said cylindrically shaped side wall at a first location for directing a control flow tangentially into said spin chamber to modulate the flow of said supply fluid, said control flow from said first control port being at a pressure equal to or less than the pressure of said supply fluid;
   e. a second control port extending through said cylindrically shaped side wall at a second location for directing a control flow tangentially into said spin chamber to modulate the flow of said supply fluid, said control flow from said second control port being at a pressure equal to or less than the pressure of said supply fluid; and
   f. each of said pair of end walls including an output port through which said supply fluid flow is capable of being discharged from said spin chamber, said flow from said output ports being in phase with the pressure of said control flows such that as the pressure of said control flows increases said flow from said output ports also increases.

8. A regulator for modulating fluid flow as set forth in claim 7 wherein:
   a. said pressure drop produced by said supply inlet nozzle has a value of approximately 10 percent of the supply fluid pressure; and
   b. the area of each of said first control port and said second control port is equal to approximately one-tenth the area of said supply inlet nozzle.

9. A regulator for modulating fluid flow as set forth in claim 8 wherein:
   a. said control flow from said first control port and said control flow from said second control port are applied in a push-pull relation; and
   b. flow modulation in the order of up to 4 to 1 is possible.

* * * * *